US012571419B2

(12) United States Patent (10) Patent No.: US 12,571,419 B2

Jepps et al. (45) Date of Patent: Mar. 10, 2026

(54) METHOD AND CONNECTING DEVICE FOR CONNECTING AT LEAST TWO ELEMENTS BY A CONNECTING ELEMENT

(71) Applicant: Atlas Copco IAS GmbH, Bretten (DE)

(72) Inventors: Lewis Jepps, Flintshire (GB); Paul Briskham, Flintshire (GB); Andrew Litherland, Flintshire (GB)

(73) Assignee: Atlas Copco IAS GmbH, Bretten (DE)

( * ) Notice: Subject to any disclaimer, the term of this patent is extended or adjusted under 35 U.S.C. 154(b) by 0 days.

(21) Appl. No.: 19/097,805

(22) Filed: Apr. 1, 2025

(65) Prior Publication Data

US 2025/0320890 A1 Oct. 16, 2025

(30) Foreign Application Priority Data

Apr. 12, 2024 (DE) ..................... 10 2024 110 303.5

(51) Int. Cl.
B21J 5/06 (2006.01)
F16B 25/00 (2006.01)
(Continued)

(52) U.S. Cl.
CPC ........... *F16B 25/0021* (2013.01); *B21J 5/066* (2013.01); *F16B 25/0084* (2013.01); *B21J 5/063* (2013.01);
(Continued)

(58) Field of Classification Search
CPC ..... B21J 5/063; B21J 5/066; B21J 5/12; B21J 15/027; B23P 19/065; Y10T 29/49835
See application file for complete search history.

(56) References Cited

U.S. PATENT DOCUMENTS 5,563,482 A 10/1996 Shaw et al.
2013/0195579 A1* 8/2013 Freis .......................... F16B 5/02
411/387.1
(Continued)

FOREIGN PATENT DOCUMENTS

DE 10348427 A1 * 5/2005 ............. B25B 21/00
DE 10 2010 025 387 A1 12/2011
(Continued)

OTHER PUBLICATIONS

Skovron, J., Mears, L., Ulutan, D., Detwiler, D. et al., "Characterization of Flow Drill Screwdriving Process Parameters on Joint Quality," Sep. 16, 2014, SAE Int. J. Mater. Manf. 8(1):2015, doi:10.4271/2014-01-2241, pp. 35-44. (Year: 2014).*
(Continued)

*Primary Examiner* — Jermie E Cozart
(74) *Attorney, Agent, or Firm* — WTA IP Law P.C.

(57) ABSTRACT

The invention relates to a method for connecting at least two elements by a connecting element. A first element, a second element and the connecting element are provided. The connecting element is placed on a surface of the first element. In a first time period, the connecting element is rotated at a first rotational speed and a first axial force is exerted on the connecting element in the direction of the surface of the first element. In a second time period, the connecting element is rotated at a second rotational speed and a second axial force is exerted on the connecting element in the direction of the surface of the first element.

10 Claims, 9 Drawing Sheets

(51) Int. Cl.
| | |
|---|---|
| *B21J 5/12* | (2006.01) |
| *B21J 15/02* | (2006.01) |
| *B23P 19/06* | (2006.01) |

(52) U.S. Cl.
CPC ................ *B21J 5/12* (2013.01); *B21J 15/027*
(2013.01); *B23P 19/065* (2013.01); *Y10T*
*29/49835* (2015.01)

(56) References Cited

U.S. PATENT DOCUMENTS

| | | | | | |
|---|---|---|---|---|---|
| 2015/0328677 | A1* | 11/2015 | Pfeiffer | ................ | F16B 25/106 29/505 |
| 2016/0091010 | A1* | 3/2016 | Freis | .................. | F16B 25/0021 411/387.1 |
| 2017/0106430 | A1* | 4/2017 | Norton | ...................... | F16B 5/02 |
| 2018/0200780 | A1* | 7/2018 | Stützer | ............... | F16B 25/0021 |
| 2018/0291943 | A1* | 10/2018 | Iwano | ................. | F16B 25/0031 |
| 2018/0291944 | A1* | 10/2018 | Iwano | .................. | F16B 5/0208 |
| 2019/0160608 | A1* | 5/2019 | Iwano | ...................... | B21J 5/066 |
| 2019/0211864 | A1* | 7/2019 | Kagami | .................... | F16B 5/02 |
| 2019/0257344 | A1* | 8/2019 | Simpson | ............... | F16B 25/106 |
| 2020/0325929 | A1* | 10/2020 | Iwano | .................. | F16B 25/106 |
| 2021/0046559 | A1* | 2/2021 | Guglhör | .................... | G01L 5/00 |
| 2022/0395892 | A1* | 12/2022 | Ludsteck | ............. | G05B 19/182 |
| 2022/0395893 | A1* | 12/2022 | Ludsteck | ............. | G05B 19/186 |
| 2023/0129583 | A1* | 4/2023 | Ruszkiewicz | ....... | F16B 25/0084 |
| 2023/0271282 | A1 | 8/2023 | Biwaki et al. | | |
| 2025/0043812 | A1 | 2/2025 | Freis et al. | | |

FOREIGN PATENT DOCUMENTS

| | | | | | |
|---|---|---|---|---|---|
| DE | 102014208989 | A1 * | 11/2015 | .......... | B21K 25/005 |
| DE | 10 2016 119 125 | A1 | 4/2017 | | |
| EP | 1118777 | A2 * | 7/2001 | ............. | B25B 23/00 |
| EP | 3348347 | A1 * | 7/2018 | ............. | B23P 19/06 |
| EP | 4102316 | B1 * | 12/2023 | ............. | B23P 19/06 |
| JP | 2002224969 | A | 8/2002 | | |
| JP | 2005231032 | A | 9/2005 | | |
| JP | 2020163500 | A | 10/2020 | | |
| JP | 6958365 | B2 | 11/2021 | | |
| JP | 2023125498 | A | 9/2023 | | |
| WO | WO 2023214164 | A1 | 11/2023 | | |

OTHER PUBLICATIONS

GB Search Report of the corresponding Application No. GB2505492.5 mailed on Oct. 8, 2025.
JP Publication Submission form of the corresponding JP Application No. 2025-61816 mailed on Jan. 5, 2026.

* cited by examiner

45

41

METHOD AND CONNECTING DEVICE FOR CONNECTING AT LEAST TWO ELEMENTS BY A CONNECTING ELEMENT

CROSS-REFERENCE TO RELATED APPLICATIONS

This applications claims priority to German Patent Application No. 10 2024 110 303.5 filed on Apr. 12, 2024, which is incorporated by reference herein in its entirety.

FIELD OF INVENTION

The present disclosure relates to a method for connecting at least two elements by a connecting element. Furthermore, the present disclosure relates to a connecting device for connecting at least two elements by a connecting element.

BACKGROUND

Connecting elements are known and are used to connect elements or components to one another. In the case of thread-forming connecting elements, no material is cut from a workpiece in order to produce a thread, but rather the material of the workpiece is formed or deformed in such a way that a thread is produced in the workpiece. When a thread-forming connecting element is inserted, no material or only a negligible amount of material is removed from the workpiece. Some thread-forming connecting elements are also able to form a hole in the workpiece in which the connecting element is arranged. The hole can be formed at the same time as the thread. Thread-forming connecting elements which can also form holes can be referred to as thread-forming and hole-forming connecting elements.

In order to insert a thread-forming and hole-forming connecting element into a workpiece, the fastening element is rotated while it is in contact with the workpiece, with the result that the workpiece is heated. The connecting element is then inserted into the workpiece. The threaded connecting element is rotated while it is inserted into the workpiece. As a result, a thread is formed in the workpiece.

The connecting element and the elements to be connected can be matched to one another in such a way that a surface of one of the elements to be connected is not pierced by the connecting element. In the region of the connecting element, a bulge then forms in the non-pierced surface.

WO 2023 214 164 A1 discloses a thread-forming and hole-forming connecting element. The connecting element comprises a head and a shank which defines a longitudinal axis. The shank comprises a shank portion and a tip portion. The shank portion extends from the head. The tip portion extends from the shank portion and is arranged opposite the head. At least part of the shank portion is threaded. The tip portion is at least partially tapered and defines a tip angle. The tip angle is at least 50 degrees.

In particular in the case of the connection of elements or components with low ductility, the bulge may tear or burst in the non-pierced surface of the element which lies opposite the element into which the connecting element is first inserted.

SUMMARY

It is an object of the present disclosure to improve a connection of two elements, specifically if at least one of the elements has a low ductility. In particular, it is an object of the present disclosure to reduce or avoid defects or cracks or ruptured regions in a connection of two elements.

Disclosed is a method for connecting at least two elements by a connecting element. The method comprises the steps of: providing a first element, a second element and the connecting element; placing the connecting element on a surface of the first element; in a first time period, rotating the connecting element at a first rotational speed and exerting a first axial force on the connecting element in the direction of the surface of the first element; and in a second time period, rotating the connecting element at a second rotational speed and exerting a second axial force on the connecting element in the direction of the surface of the first element.

The first rotational speed in the first time period may be lower than the second rotational speed in the second time period. Alternatively or additionally, the first axial force in the first time period may be higher than the second axial force in the second time period.

Furthermore disclosed is a connecting device for connecting at least two elements by a connecting element. The connecting device comprises a rotatable connecting punch configured to rotate the connecting element and to exert an axial force on the connecting element; and a control device. The control device is configured to control the connecting punch in a first time period such that the connecting element is rotated at a first rotational speed and a first axial force is exerted on the connecting element in the direction of the surface of the first element; and to control the connecting punch in a second time period such that the connecting element is rotated at a second rotational speed and a second axial force is exerted on the connecting element in the direction of the surface of the first element.

The first rotational speed in the first time period may be lower than the second rotational speed in the second time period. Alternatively or additionally, the first axial force in the first time period may be higher than the second axial force in the second time period.

Generally, the control device may be configured to control the connecting device such that any method step disclosed herein is carried out by the connecting device. In particular, the control device may be configured to control the connecting punch such that any method step disclosed herein is carried out by the connecting punch.

A first element and a second element may be provided in order to connect them. In this case, the elements may be placed one on top of the other. The connecting element may be placed on a surface of the first element. In the case of a rotation of the connecting element and a force on the connecting element in the direction of the surface, heat is produced by friction between the connecting element and the first element. The heat reduces the hardness and/or strength of the first element and, if appropriate, of the second element, with the result that the connecting element penetrates at least into the first element. If the connecting element has penetrated a distance into the first element and, if appropriate, into the second element, a thread of the connecting element first of all makes contact with the first element and a thread corresponding to the thread of the connecting element is formed. The connecting element may then be inserted into the first and second elements up to its final penetration depth in order to connect the elements. In this case, the process may be designed such that the connecting element does not protrude from the second element. That is to say, the tip of the connecting element remains in the stack of the first and second elements. In other words, a surface, namely the surface which faces away from the first element, cannot be pierced by the connecting element. A bulge which is formed by formed material then forms on this surface.

In particular if one of the elements, for example the second element, has a low ductility, the bulge may tear or burst. As a result, the strength of the connection may be reduced or defective.

By increasing the rotational speed of the connecting element and/or reducing the force with which the connecting element is pressed in the direction of the elements, the first element and, if appropriate, the second element are heated to a greater extent. At the same time, the penetration speed of the connecting element into the stack of the first and second elements is reduced. The ductility of the elements is increased by the greater heating. To a certain extent, the process according to the invention makes it possible for the connecting element to penetrate further only when the elements have a ductility which is sufficient as a result of the heating or sufficiently reduced hardness and/or reduced strength. Accordingly, tearing and/or bursting of the bulge formed on the surface of the second element may be reduced or avoided.

When the first and second elements are provided, they may be placed one on top of the other. In particular, the first element and the second element (placed one on top of the other) may be fixed relative to one another. The fixing may be carried out by a hold-down device.

The connecting element may be held by a connecting device during the provision. The connecting device may comprise a connecting punch. The connecting element may be held and rotated by the connecting punch. Likewise, an axial force (in relation to the axis of rotation of the connecting element) may be applied to the connecting element by the connecting punch.

The connecting element may be placed on the surface of the first element by the connecting device, in particular by the connecting punch.

Preferably, the first element and/or the second element does not have a hole in a region of the first or second element axially aligned with the axis of rotation of the connecting element before or when the connecting element is placed on the surface of the first element. That is to say, the connecting element may be introduced into the first and second element without pre-punching the first and/or second element.

The first time period and the second time period may directly adjoin one another. That is to say, no further time period may lie between the first time period and the second time period. The first time period may lie before the second time period in terms of time.

The first time period may have a duration of at least 0.5 s. In particular, the first time period may have a duration of between 0.5 s and 6 s, preferably between 1 s and 4 s, preferably between 1.5 s and 3 s.

The second time period may have a duration of at least 0.5 s. In particular, the second time period may have a duration of between 0.5 s and 6 s, preferably between 1 s and 4 s, preferably between 1.5 s and 3 s.

The first time period and the second time period together (addition of the duration of the first time period and the duration of the second time period) may have a duration of between 0.5 s and 12 s, preferably between 0.5 s and 10 s, preferably between 1 s and 8 s, preferably between 2 s and 7 s, preferably between 3 s and 6 s. The first time period and the second time period may have a substantially identical duration.

The first rotational speed in the first time period may be at least 10%, preferably at least 15%, preferably at least 20%, preferably at least 25%, preferably at least 30%, preferably at least 35%, preferably at least 40%, preferably at least 45%, preferably at least 50%, lower than the second rotational speed in the second time period.

The first rotational speed in the first time period may be at most 70%, preferably at most 60%, preferably at most 50%, preferably at most 45%, preferably at most 40%, preferably at most 35%, preferably at most 30%, preferably at most 25%, preferably at most 20%, lower than the second rotational speed in the second time period.

For example, if the first rotational speed is 10% lower than the second rotational speed and the second rotational speed is 1000 rpm (revolutions per minute), the first rotational speed is 900 rpm.

The first axial force in the first time period may be at least 10%, preferably at least 15%, preferably at least 20%, preferably at least 25%, preferably at least 30%, preferably at least 35%, preferably at least 40%, preferably at least 45%, preferably at least 50%, preferably at least 55%, preferably at least 60%, preferably at least 70%, preferably at least 80%, preferably at least 90%, preferably at least 100%, higher than the second axial force in the second time period.

The first axial force in the first time period may be at most 120%, preferably at most 110%, preferably at most 100%, preferably at most 90%, preferably at most 80%, preferably at most 75%, preferably at most 70%, preferably at most 65%, preferably at most 60%, preferably at most 55%, preferably at most 50%, preferably at most 45%, preferably at most 40%, preferably at most 35%, preferably at most 30%, higher than the second axial force in the second time period.

For example, if the first axial force is 10% higher than the second axial force and the second axial force is 1000 N (Newtons), the first axial force is 1100 N.

The axial force may act along the axis of rotation of the connecting element.

The length of the first time period and the length of the second time period may be based on a penetration depth of the connecting element into the first element or into the first element and the second element. That is, the respective length of the first time period and the second time period may be a function of the penetration depth of the connecting element. The penetration depth may be based on penetration of the connecting element into the first element or on penetration into the first and second elements. The second case may occur if the connecting element completely penetrates the first element and also penetrates into the second element in the first or second time period.

The length of the first time period may last until a first (absolute) fixed penetration depth of the connecting element into the first element or into the first element and the second element is reached. For example, the (absolute) first fixed penetration depth is between 1 mm and 4 mm, preferably between 2 mm and 3 mm. The length of the second time period may last until a (absolute) second fixed penetration depth of the connecting element into the first element or into the first element and the second element is reached. For example, the (absolute) second fixed penetration depth is between 3 mm and 7 mm, preferably between 4.5 mm and 5.5 mm.

The connecting element may comprise a head and a shank. The shank may have a threaded portion. The threaded portion may have a thread, in particular an external thread. The shank may have a tip portion opposite the head. The tip portion may have no thread.

The connecting element may be a screw with a tip portion that has no thread.

The tip portion may be placed on the surface of the first element. By rotating the connecting element and exerting an axial force on the connecting element, friction is caused between the connecting element and the first element. Depending on the axial force and depending on the material properties of the first element, the connecting element penetrates into the first element. If the connecting element has penetrated so deeply into the first element or into the first element and the second element that the thread of the threaded portion comes into contact with the first element, a thread corresponding to the thread of the threaded portion is formed in the first element and/or in the second element when the connecting element penetrates further.

The threaded portion may contact the first element and/or the second element in the first time period and/or in the second time period. If a thread corresponding to the thread of the threaded portion is formed in the first and/or second element, the corresponding thread may be removed partially by the rotation of the connecting element. If the first and second element are connected to each other by the connecting element, a thread corresponding to the thread of the threaded portion may be formed at least partially in the second element.

Preferably, the threaded portion does not contact the first element and/or the second element at least temporarily in the first time period. At the beginning of the first time period, only the tip portion of the connecting element may contact the first element. If the connecting element penetrates further into the first element in the first time period, the threaded portion of the connecting element may contact the first element. In the first time period, the threaded portion may temporarily not contact and temporarily contact the first element.

If the first element and the second element are connected by the connecting element, the connecting element may have penetrated into the first and second elements up to its final penetration depth. Preferably, the head of the connecting element then lies outside the first and second elements. A portion of the head may then bear against a surface of the first element.

The tip portion may be surrounded by the first and/or second element when the first and second element are connected to each other. In particular, the tip portion may be surrounded by the first and/or second element when the connecting element has penetrated into the first and second elements to its final depth. If the first and second element are connected to each other or if the connecting element has penetrated into the first and second elements to its final depth, the tip portion cannot protrude from the first and/or second element. The tip portion may be at least partially surrounded by a bulge formed in the second element. If the first and second element are connected to each other or if the connecting element has penetrated into the first and second elements to its final depth, a surface of the second element cannot be pierced by the connecting element.

An energy input into the first and/or second element may be greater in the second time period than in the first time period. In particular, the energy input per unit time, that is to say a power input, into the first and/or second element may be greater in the second time period than in the first time period. Likewise, the absolute energy input (in joules) into the first and/or second element may be greater in the second time period than in the first time period. Likewise, the energy input into the first and/or second element may be greater in the second time period in relation to the penetration depth than in the first time period in relation to the penetration depth. That is to say, in relation to the penetration depth (for example per 1 mm penetration depth), a higher energy or a higher power may be input into the first and/or second element in the second time period.

The energy input or the power input may be converted into heat for the most part or almost completely (to an extent of at least 90%). The energy input or the power input may be defined by the energy consumption or the power consumption of the connecting device or of the connecting punch. As a result, the first element and, if appropriate, the second element can be heated to a greater extent in the second time period than in the first time period.

The first element and/or the second element may be a component. In particular, the first element and/or the second element may comprise metal or consist of metal. Preferably, the first element is a metal element or a metal component, in particular a steel element or a steel component. The first element may likewise be an aluminum component. The aluminum component may consist of or comprise an AA5000, AA6000 or AA7000 alloy. The second element may be a metal element or a metal component, in particular an aluminium element or aluminium component. Particularly preferably, the second element is an aluminium die-cast element. The second element may be a non-heat-treated aluminium die-cast element. Likewise, the second element may be an aluminium die-cast element with a high proportion of secondary aluminium, i.e. a high proportion of recycled aluminium. The second element may consist of or comprise an AA7000 alloy, in particular in the T6 state. Joining a component with an AA7000 alloy in the T6 state was possible without problems by the method according to the invention.

The first rotational speed may be constant at least in sections in the first time period. Alternatively or additionally, the second rotational speed may be constant at least in sections in the second time period. The first axial force may be constant at least in sections in the first time period. Alternatively or additionally, the second axial force may increase at least in sections in the second time period.

"At least in sections" may stand for a portion of the respective time period of at least 30%, preferably at least 40%, preferably at least 50%, preferably at least 60%, preferably at least 70%, preferably at least 80%, preferably at least 90%, preferably at least 95%, of the entire time period.

In the first time period, the rotational speed may be increased from 0 to a first fixed value. The rotational speed may then be kept substantially constant in the first time period. The portion within the first time period in which the rotational speed is increased may be smaller than the portion within the first time period in which the rotational speed is kept substantially constant. In the second time period, the rotational speed may be increased to a second fixed value. The rotational speed may then be kept substantially constant at the second fixed value in the second time period. The portion within the second time period in which the rotational speed is increased may be smaller than the portion within the second time period in which the rotational speed is kept substantially constant.

Generally, "substantially" may mean a deviation of ±10% or ±5%.

In the first time period, the axial force may be increased from 0 to a first fixed value. The axial force may then be kept substantially constant in the first time period. The portion within the first time period in which the axial force is increased may be smaller than the portion within the first time period in which the axial force is kept substantially constant. In the second time period, the axial force may be reduced to a second fixed value. The axial force may then be increased in the second time period, in particular starting from the second fixed value. For example, the axial force is increased continuously or stepwise in the second time period starting from the second fixed value. This may be carried out up to a third value. The third value may lie below the first fixed value. The portion within the second time period in which the axial force is reduced may be smaller than the portion within the second time period in which the axial force is increased.

The method may further comprise: in a third time period, rotating the connecting element at a third rotational speed and exerting a third axial force on the connecting element in the direction of the surface of the first element. The third rotational speed in the third time period may be lower than the first rotational speed in the first time period. Alternatively or additionally, the third rotational speed in the third time period may be lower than the second rotational speed in the second time period. The third axial force in the third time period may be lower than the first axial force in the first time period. Alternatively or additionally, the third axial force in the third time period may be lower than the second axial force in the second time period.

The first time period, the second time period and the third time period may directly adjoin one another. The third time period may directly adjoin the second time period. No further time period may lie between the second time period and the third time period. The second time period may lie before the third time period in terms of time.

In the third time period, the threaded portion of the connecting element may make contact with the first and/or second element. In the third time period, a thread corresponding to the thread of the threaded portion may be formed in the first and/or second element. At the end of the third time period, the connecting element may be present in its final position or final penetration depth in the first and second elements.

In general, the rotational speed in a respective time period may be an average rotational speed in the time period. Likewise, the axial force in a respective time period may be an average axial force in the time period.

BRIEF DESCRIPTION OF THE DRAWINGS

The invention is described in detail below with reference to figures.

DETAILED DESCRIPTION

Figure 1A:
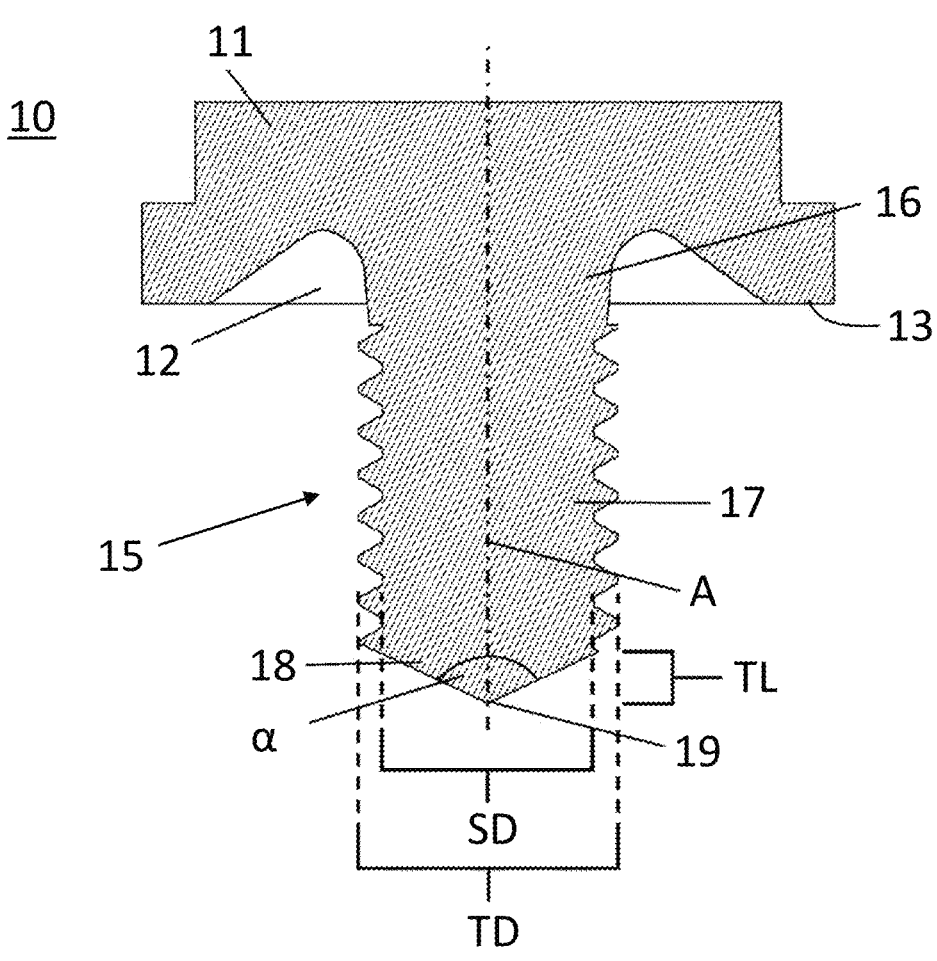
FIG. 1A shows a connecting element.
Figure 1B:
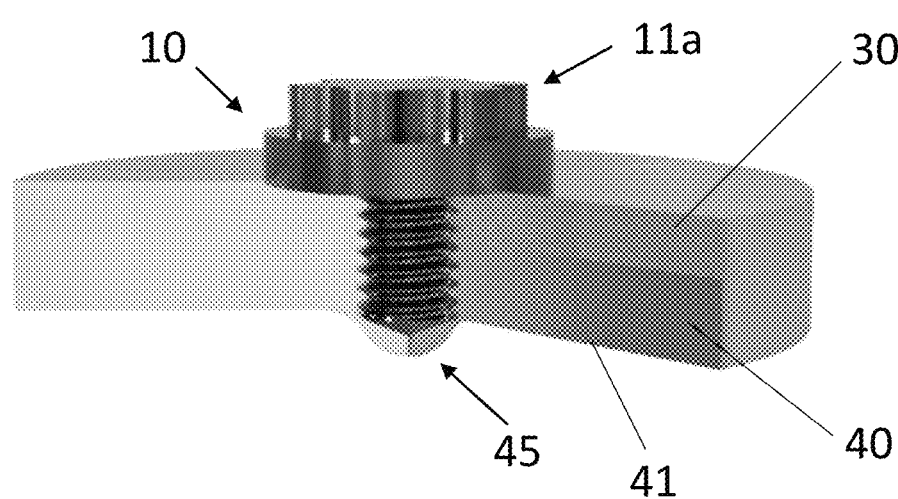
FIG. 1B shows a connection of two elements by a connecting element.

FIG. 1A shows a connecting element 10 in a cross section. The connecting element 10 may comprise or consist of steel. The connecting element 10 may comprise a head 11. The head 11 may have an underside 13. The connecting element 10 may comprise a shank 15. The shank 15 may extend starting from the underside 13 of the head 11. As shown in FIG. 1B, the head 11 may comprise a drive geometry 11a. The circumference of the drive geometry 11a may define a discontinuous profile. During use, the drive geometry 11a is brought into engagement with a connecting device 60 or a connecting punch 70 of the connecting device 60, with the result that a torque can be transmitted from the connecting device 60 or a connecting punch 70 to the connecting element 10. The drive geometry 11a may be male or female.

The head 11 may have an undercut 12. The undercut 12 may adjoin and, in particular, extend around the shank 15. The undercut 12 is able to receive material from a workpiece (for example from a first element 30 and/or a second element 40) during use of the connecting element 10. The undercut 12 does not have to be present. If the undercut 12 is not present, the underside 13 of the head 11 may be substantially planar.

The shank 15 may comprise a base portion 16. The base portion 16 may adjoin the head 11. The base portion 16 may have no thread. In particular, the base portion 16 is surrounded by the undercut 12.

The shank 15 may comprise a threaded portion 17. The threaded portion 17 may adjoin the base portion 16 or the head 11. The threaded portion 17 may comprise a thread, in particular an external thread.

The shank 15 may comprise a tip portion 18. The tip portion 18 may adjoin the threaded portion 17. The tip portion 18 may have no thread.

The shank 10 may have a shank diameter SD. The shank diameter SD may exclude the diameter of the base portion 11. The shank diameter SD may be at least 2 mm. The shank diameter SD may be at most 10 mm. In particular, the shank diameter SD is between 3 mm and 8 mm, preferably between 3.5 mm and 5.5 mm. The shank 15 may define a longitudinal axis A. The longitudinal axis A may be identical to the axis of rotation of the connecting element 10. The connecting element 10 may be formed rotationally symmetrically about the longitudinal axis A.

The threaded portion 17 may have a thread diameter TD. The thread diameter TD may be substantially constant over the length of the threaded portion 17.

The tip portion 18 may be formed at one end of the shank 15. The end of the shank 15 may be opposite the head 11. The tip portion 18 may be tapered, in particular in relation to the shank 15 or in relation to the shank 15. The tip portion 18 may have a tip angle $\alpha$. The tip angle $\alpha$ may be understood to relate to the internal angle of the tip of the tip portion 18, in particular as illustrated in FIG. 1A. The tip angle $\alpha$ may be at least 50°. The tip angle $\alpha$ may be at most 160°. In particular, the tip angle $\alpha$ may be between 125° and 135°. The tip portion 18 may be formed conically, frustoconically or tapered. The tip portion 18 may have a tip 19. The tip 19 may define an end point of the tip portion 18. Alternatively, the tip 19 may be flattened.

The tip portion 18 may have a tip length TL. The tip length TL may be oriented parallel to the longitudinal axis A. Preferably, a ratio of the tip length TL to the thread diameter TD is at most 0.6.

The connecting element 10 may be a thread-forming and/or hole-forming connecting element. That is to say, a hole can be formed by the connecting element 10 in the elements 30, 40 to be connected or a thread, in particular an internal thread, can be formed in the elements 30, 40 to be connected.

FIG. 1B shows a partial section of two connected elements 30, 40. The first element 30 is connected to the second element 40 by a connecting element 10. The connecting element 10 cannot protrude through a surface 41 of the second element 40. Bei dem Einbringen des Verbindungselements 10 in das erste und zweite Element 30, 40 kann eine Ausbeulung 45 gebildet werden. The bulge 45 may be formed on the surface 41 of the second element 40 which is not pierced by the connecting element 10. The tip portion 18 of the connecting element 10 may be (completely) surrounded by the first and/or second element 30, 40. The bulge 45 may consist of material of the second element 40 which is displaced during the introduction of the connecting element 10 into the first element 30 and the second element 40. The bulge 45 may surround the connecting element 10, in particular the tip portion 18, and preferably delimit it from the surroundings.

FIGS. 2A to 2D show various method steps in the introduction of a connecting element 10 into the first and second element 30, 40 in order to connect them.

Figure 2A:
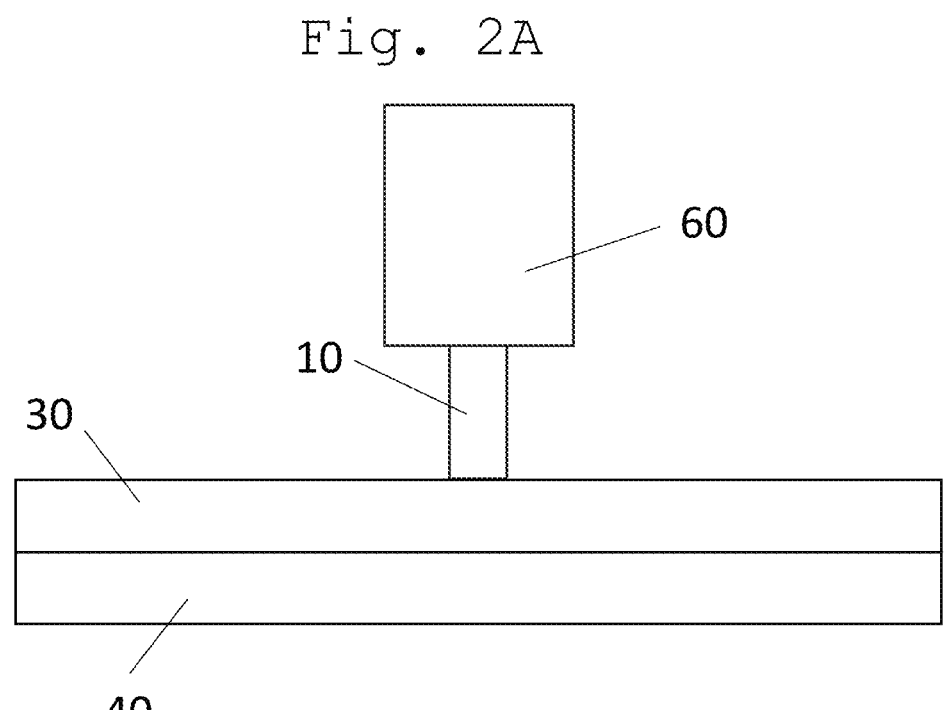
FIG. 2A shows a method step in the connection of two elements in connecting element.

In FIG. 2A, firstly the first element 30 and the second element 40 are provided. For example, the first and second elements 30, 40 are placed one on top of the other and, if appropriate, held in position. A connecting element 10 is likewise provided. The connecting element 10 may be received by a connecting device 60. The connecting element 10 may be positioned such that a portion, in particular the tip portion 18, contacts a surface of the first element 30. In the region in which the connecting element 10 makes contact with the first element 30, no hole or no pre-hole may be formed.

Figure 2B:
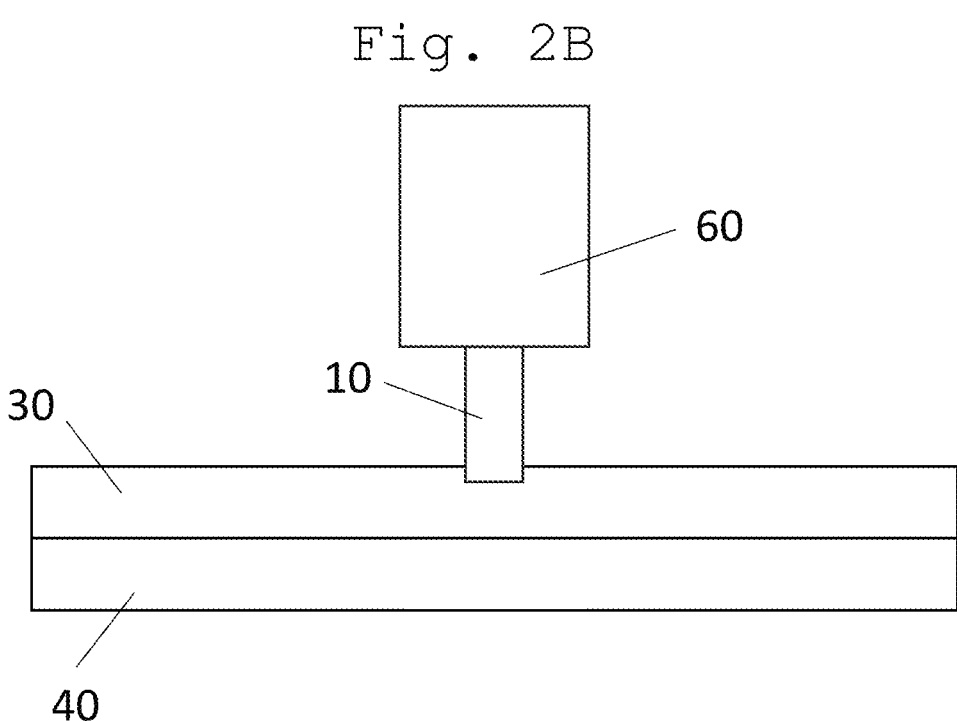
FIG. 2B shows a method step in the connection of two elements by a connecting element.

In FIG. 2B, the connecting element 10 is rotated by the connecting device 60 and the connecting device 60 exerts an axial force on the connecting element 10. By the rotation and the axial force, friction is caused between the connecting element 10 and the first element 30, as a result of which the first element 30 is heated. The heat may be transmitted partially to the second element 40, for example by conduction. In this case, a portion of the connecting element 10, in particular the tip portion 18, penetrates into the first element 30. Preferably, however, the connecting element 10 initially penetrates only to such an extent that the threaded portion 17 is located outside the first element 30. The threaded portion 17 may therefore not (yet) make contact with the first element 30. Likewise, the connecting element 10 may already penetrate into the first element 30 in such a way that the threaded portion 17 makes contact with the first element 30. This is the case in particular if the first element 30 has a thickness of at least 1 mm.

The method steps as described with regard to FIGS. 2A and 2B may lie in the first and second time periods.

Figure 2C:
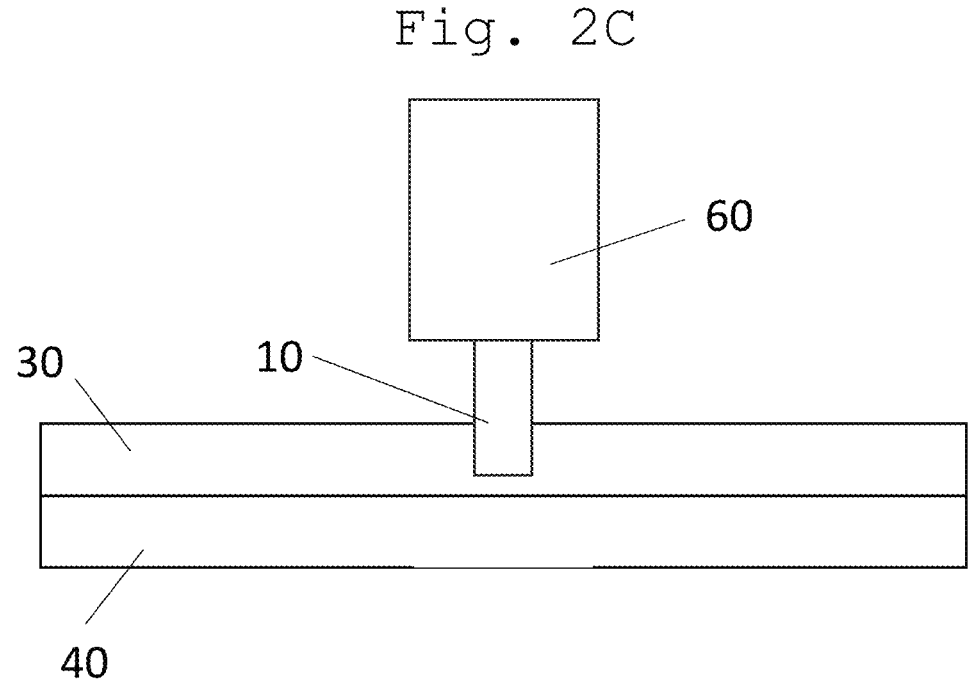
FIG. 2C shows a method step in the connection of two elements by a connecting element.

In FIG. 2C, the connecting element 10 penetrates further into the first element 30, in particular to such an extent that the threaded portion 17 is located partially within the first element 30. The threaded portion 17 may therefore make contact with the first element 30 at the latest in this method portion. As a result, a thread (internal thread) corresponding to the thread of the threaded portion 17 can be formed in the first element 30 and, with further penetration, in the second element. The method steps described with regard to FIG. 2D may lie in the first and second time periods.

Figure 2D:
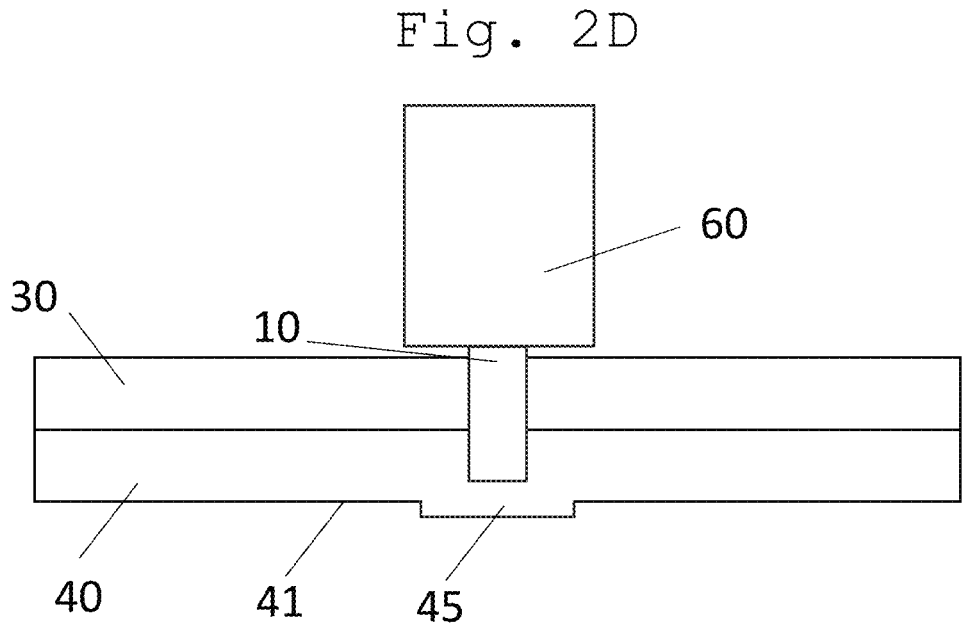
FIG. 2D shows a method step in the connection of two elements 30, 40 by a connecting element.

In FIG. 2D, the connecting element 10 is shown in its final position or in its final penetration depth into the first and second elements 30, 40. The head 11 or the underside 13 of the head 11 may bear against a surface of the first element 30. A thread may be formed only in the second element 40 or in the first element 30 and in the second element 40 by the connecting element 10.

By displacing material of the first and/or second element 30, 40, in particular of the second element 40, a bulge 45 may form on a surface 41 of the second element 40. The bulge 45 may surround the connecting element 10, in particular the tip portion 18.

Figure 3:
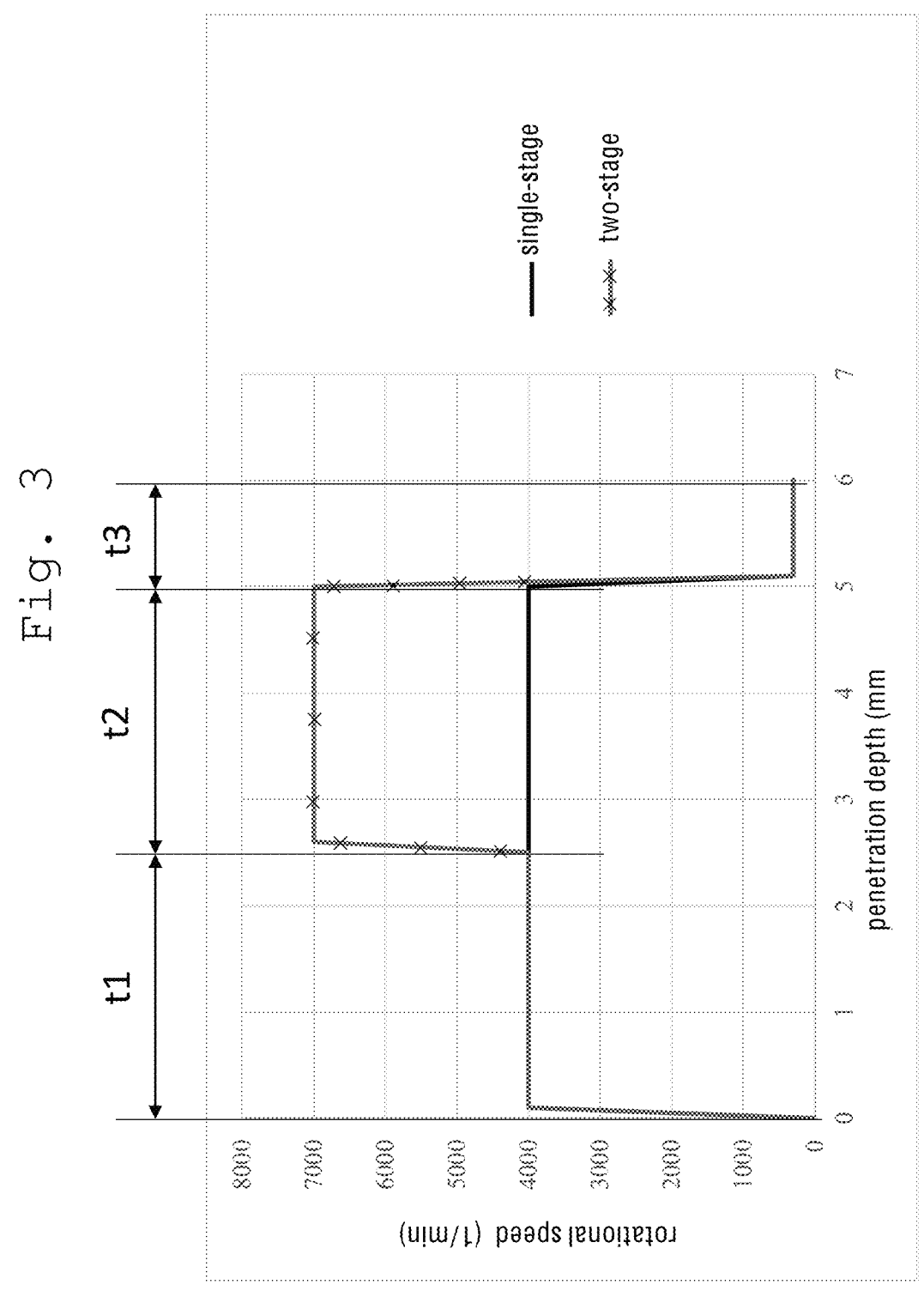
FIG. 3 shows a diagram of the rotational speed against the penetration depth of a connecting element.

FIG. 3 shows a diagram with two profiles. The x-axis of the diagram is the penetration depth of the connecting element 10 into the first and, if appropriate, the second element 30, 40. The y-axis is the rotational speed of the connecting element 10. The two profiles partially overlap. The profiles differ in particular in the second time period t2 and the third time period t3. The profiles may differ in the second time period t2 as a matter of priority. In the third time period t3, the profiles may differ only at the beginning of the third time period t3 and may be the same in the further profile. The profiles may likewise differ only in the second time period t2. A first profile is referred to as "single-stage" and a second profile is referred to as "two-stage". In the region in which the first profile and the second profile differ, the two-stage profile is denoted by "x". The profile referred to as "two-stage" corresponds to the invention.

In a first time period t1, the connecting element 10 is placed on the surface of the first element 30 and the rotation of the connecting element 10 is begun. In the diagram, this is illustrated as an increase in the rotational speed at the beginning of the first time period t1. The rotational speed may be set to a first (fixed) value. In the example of FIG. 3, the first (fixed) value is approximately 4000 rpm.

In the first time period t1, the rotational speed may be kept substantially constant. Alternatively, the rotational speed may be varied in the first time period t1.

The first time period t1 may last until a first value of the penetration depth is reached. The first time period t1 may be defined by reaching a first fixed penetration depth. In the example of FIG. 3, the first penetration depth is approximately 2.5 mm.

In the first time period t1, only or at most the tip portion 18 of the connecting element 10 may contact the first element 30. The threaded portion 17 may not contact the first element 30. Likewise, the threaded portion 17 may already contact the first element 30 in the first time period t1. This is the case in particular if the thickness of the first element 30 is at least 1 mm.

The second time period t2 may adjoin the first time period t1, preferably without interruption. In the second time period t2, the rotational speed may be kept further constant in the single-stage process. In the two-stage process according to the invention, the rotational speed of the connecting element 10 may be increased. In particular, the rotational speed may be increased to a second (fixed) value in the second time period t2.

In the second time period t2, the rotational speed (at the second value of the rotational speed) may be kept substantially constant. Alternatively, the rotational speed may be varied in the second time period t2. The average rotational speed may lie above the average rotational speed in the first time period t1 in the second time period t2. An average rotational speed may be the averaged rotational speed over an entire time period.

The second time period t2 may last until a second (fixed) value of the penetration depth is reached. The second time period t2 may be defined by reaching a second (fixed) penetration depth. In the example of FIG. 3, the second (fixed) penetration depth is approximately 5 mm.

In the second time period t2, the threaded portion 17 may contact the first element 30, in particular the first element 30 and the second element 40.

The third time period t3 may adjoin the second time period t2, preferably without interruption. In the third time period t3, the rotational speed may be reduced. In particular, the rotational speed may be reduced to a third (fixed) value in the third time period t3.

In the third time period t3, the rotational speed (at the third value of the rotational speed) may be kept substantially constant. Alternatively, the rotational speed may be varied in the third time period t3.

In particular, the rotational speed in the third time period t3 may lie below the first value of the rotational speed in the first time period t1 and below the second value of the rotational speed in the second time period. The average rotational speed may lie below the average rotational speed of the second time period t2 and below the average rotational speed of the first portion t1 in the third time period t3.

In relation to the (average) rotational speed in the second time period t2, the rotational speed may be reduced in the third time period by at least 20%, preferably at least 30%, preferably at least 40%, preferably at least 50%, preferably at least 60%, preferably at least 70%, preferably at least 80%, preferably at least 85%, preferably at least 90%, preferably at least 95%.

The third time period t3 may last until a (fixed) third value of the penetration depth is reached. The third time period t3 may be defined by reaching a (fixed) third penetration depth. Likewise, the third time period t3 may be defined by reaching a (fixed) torque. When the head 11 of the connecting element 10 contacts the surface of the first element 30, the torque rises steeply.

In the third time period t3, the threaded portion 17 may contact the second element 40 or the first element 30 and the second element 40. At the end of the third time period t3, the connecting element 10 may reach its final position in the first and second elements 30, 40 or its final penetration depth in the first and second elements 30, 40. The connecting process may then be concluded.

By virtue of the fact that the connecting element 10 is first of all rotated at an average rotational speed, and when the tip 19 of the connecting element 10 lies closer to the second element 40—since the connecting element 10 has already penetrated at least partially into the first element 30—is rotated at a higher rotational speed, the second element 40 can be heated to a greater extent. In particular if the second element 40 has a low ductility (at room temperature), the ductility of the second element 40 may be increased during the connecting process. Furthermore, the hardness and/or strength of the second element 40 may be reduced during the connecting process. As a result, tearing or bursting of the bulge 45 formed in a surface of the second element 40 may be reduced or avoided.

Figure 4:
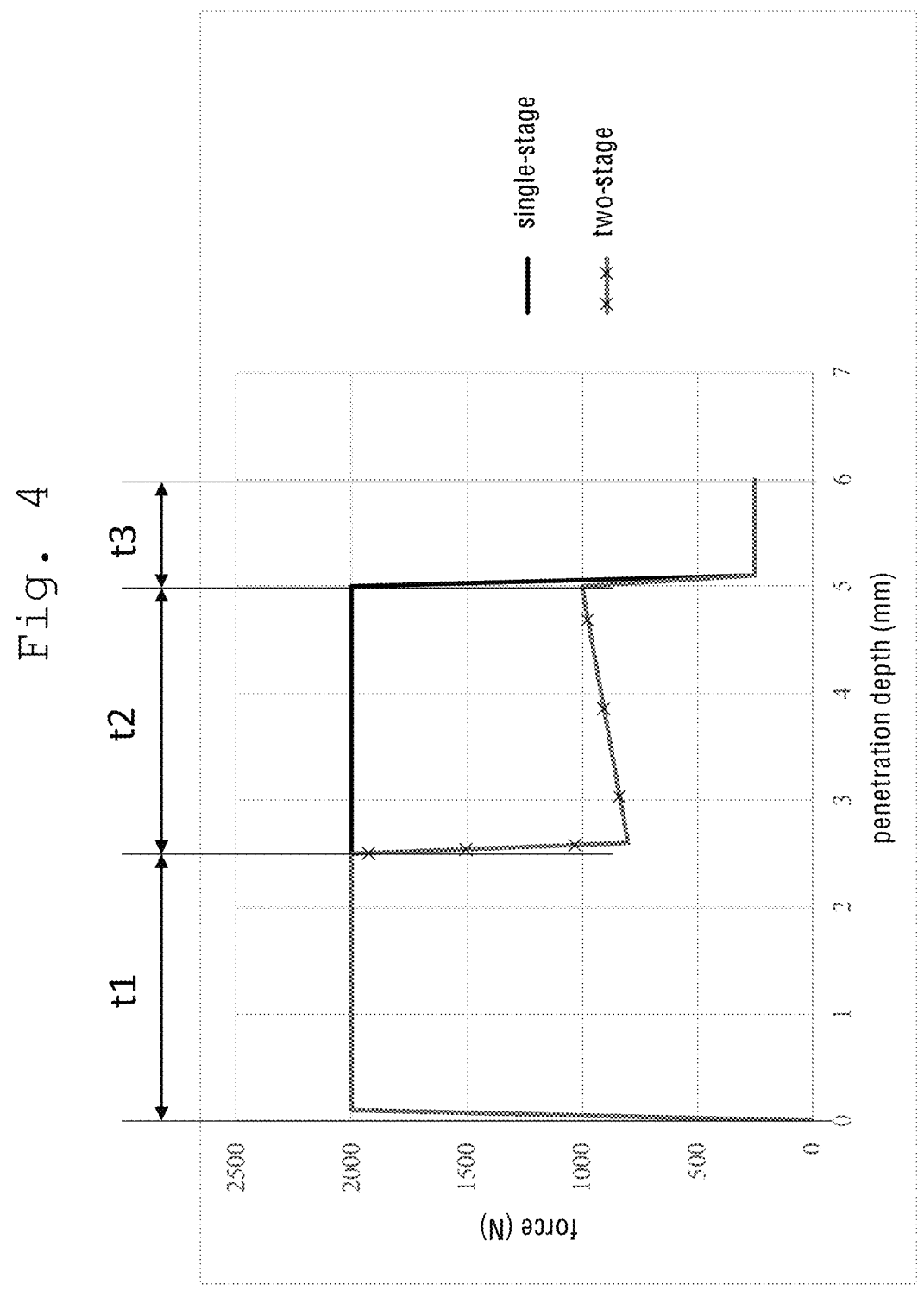
FIG. 4 shows a diagram of the (axial) force against the penetration depth of a connecting element.

FIG. 4 shows a diagram with two profiles. The x-axis of the diagram is the penetration depth of the connecting element 10 into the first and, if appropriate, the second element 30, 40. The x-axis may be identical to the x-axis of the diagram illustrated in FIG. 3. The y-axis is the (axial)

force exerted on the connecting element 10. The two profiles partially overlap. The profiles differ in particular in the second time period t2 and the third time period t3. The profiles may differ in the second time period t2 as a matter of priority. In the third time period t3, the profiles may differ only at the beginning of the third time period t3 and may be the same in the further profile. The profiles may likewise differ only in the second time period t2. A first profile is again referred to as "single-stage" and a second profile is referred to as "two-stage". In the region in which the first profile and the second profile differ, the two-stage profile is denoted by "x". The profile referred to as "two-stage" corresponds to the invention. The time periods t1, t2 and t3 may be identical to the time periods t1, t2, t3 of FIG. 3.

In the first time period t1, the connecting element 10 is placed on the surface of the first element 30 and an axial force is exerted. The "axial force" relates to the axis of rotation or the longitudinal axis of the connecting element 10. In the diagram, this is illustrated as an increase in the axial force at the beginning of the first time period t1. The axial force may be set to a first (fixed) value. In the example of FIG. 4, the first (fixed) value is approximately 2000 N.

In the first time period t1, the axial force may be kept substantially constant. Alternatively, the axial force may be varied in the first time period t1.

The second time period t2 may adjoin the first time period t1, preferably without interruption. In the second time period t2, the axial force may be kept further constant in the single-stage process. In the two-stage process according to the invention, the axial force on the connecting element 10 may be reduced. In particular, the axial force may be reduced to a second (fixed) value in the second time period t2.

In the second time period t2, the axial force may be increased, in particular over a penetration depth range of at least 0.5 mm, preferably at least 1 mm, preferably at least 1.5 mm, preferably at least 2.0 mm. The axial force may be increased continuously or stepwise. Alternatively, the axial force (at the second value of the axial force) may be kept substantially constant. The average axial force may lie above the axial force in the first time period t1 in the second time period t2. An average axial force may be the averaged axial force over an entire time period.

The second time period t2 may last until a second (fixed) value of the penetration depth is reached. The second time period t2 may be defined by reaching a second (fixed) penetration depth. In the example of FIG. 3, the second (fixed) penetration depth is approximately 5 mm.

In the second time period t2, the threaded portion 17 may make contact with the first element 30 and, if appropriate, the second element 40.

The third time period t3 may adjoin the second time period t2, preferably without interruption. In the third time period t3, the axial force may be reduced. In particular, the axial force may be reduced to a third (fixed) value in the third time period t3.

In the third time period t3, the axial force (at the third value of the axial force) may be kept substantially constant. Alternatively, the axial force may be varied in the third time period t3.

In particular, the axial force in the third time period t3 may lie below the first value of the axial force in the first time period t1 and below the second value of the axial force in the second time period. The average axial force may lie below the average axial force of the second time period t2 and below the average axial force of the first portion t1 in the third time period t3.

In relation to the (average) axial force in the second time period t2, the axial force may be reduced in the third time period by at least 20%, preferably at least 30%, preferably at least 40%, preferably at least 50%, preferably at least 55%, preferably at least 60%, preferably at least 65%, preferably at least 70%, preferably at least 75%, preferably at least 80%.

The third time period t3 may last until a (fixed) third value of the penetration depth is reached. The third time period t3 may be defined by reaching a (fixed) third penetration depth. Likewise, the third time period t3 may be defined by reaching a (fixed) torque.

In the third time period t3, the threaded portion 17 may contact the second element 40 or the first element 30 and the second element 40. At the end of the third time period t3, the connecting element 10 may reach its final position in the first and second elements 30, 40 or its final penetration depth in the first and second elements 30, 40. The connecting process may then be concluded.

As a result of the axial force being reduced and, if appropriate, increased continuously in the second time period t2, at least part of the bulge 45 is formed in the surface 41 of the second element 40 only when the ductility is sufficiently high as a result of the heating or when the hardness and/or strength of the second element 40 is sufficiently reduced. This reduces or avoids tearing or bursting of the bulge 45.

Figure 5:
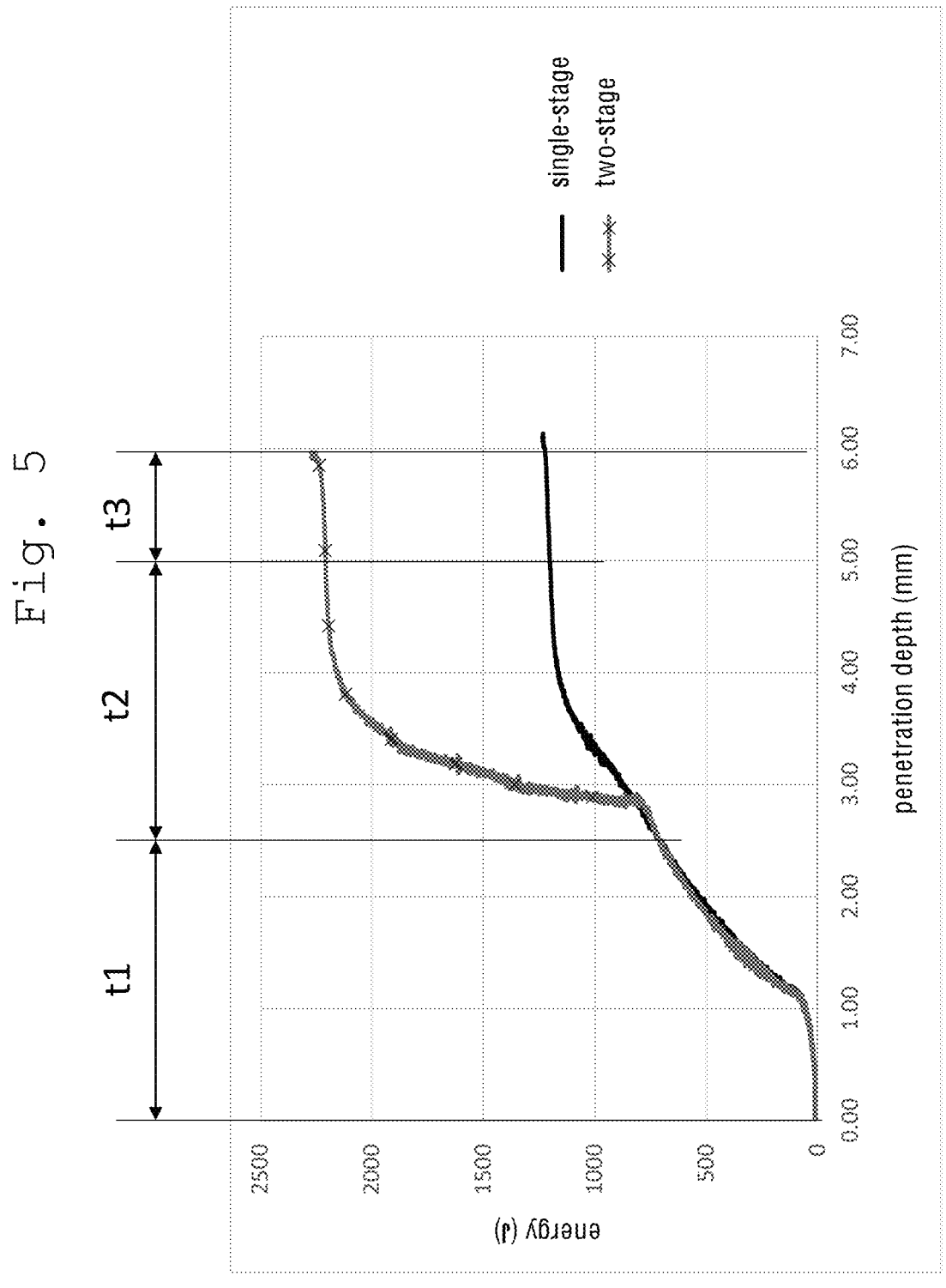
FIG. 5 shows a diagram of the (input) energy against the penetration depth of a connecting element.

FIG. 5 shows a diagram with two profiles. The x-axis of the diagram is the penetration depth of the connecting element 10 into the first and, if appropriate, the second element 30, 40. The x-axis may be identical to the x-axis of the diagrams illustrated in FIGS. 3 and 4. The y-axis is the (cumulative) energy input into the first and, if appropriate, second element 30, 40. The energy may also be understood to be energy applied to the connecting element 10 by the connecting device 60. The two profiles partially overlap. The profiles differ in particular in the second time period t2 and the third time period t3. A first profile is again referred to as "single-stage" and a second profile is referred to as "two-stage". In the region in which the first profile and the second profile differ, the two-stage profile is denoted by "x". The profile referred to as "two-stage" corresponds to the invention. The time periods t1, t2 and t3 may be identical to the time periods t1, t2, t3 of FIGS. 3 and 4.

In particular, in the second time period t2, more energy is input into the first and, if appropriate, second element 30, 40 in the two-stage process than in the single-stage process. As a result of the increased energy input in the second time period t2, tearing or bursting of the bulge 45 in the surface 41 of the second element 40 is reduced or avoided.

Figure 6:
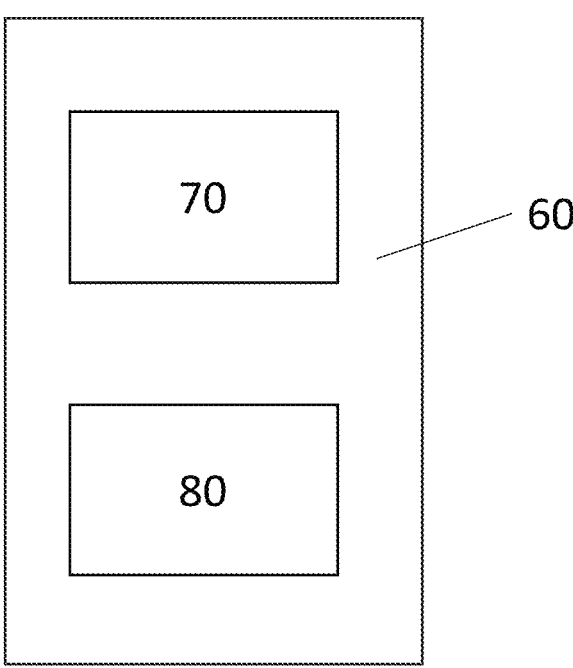
FIG. 6 shows a diagram of a connecting device.

FIG. 6 schematically shows a connecting device 60. The connecting device 60 may comprise a connecting punch 70. The connecting punch 70 may come into engagement with a connecting element 10. The connecting element 10 may be rotated by the connecting punch 70 and an axial force may be applied to the connecting element 10 by the connecting punch 70. For this purpose, the connecting punch 70 may be rotatable and/or axially displaceable.

The connecting device 60 may comprise a control device 80. The control device 80 may be configured to control the connecting punch 70. In particular, the control device 80 is configured to control the rotational speed of the connecting punch 70 or of the connecting element 10, to control the axial displacement of the connecting punch 70 or the axial force applied to the connecting element 10 and/or to control an energy input into the first and, if appropriate, second element 30, 40.

The connecting device is preferably an Atlas Copco KFLOW® system available from Atlas Copco IAS GmbH, Geretsried, Germany.

Figure 7:
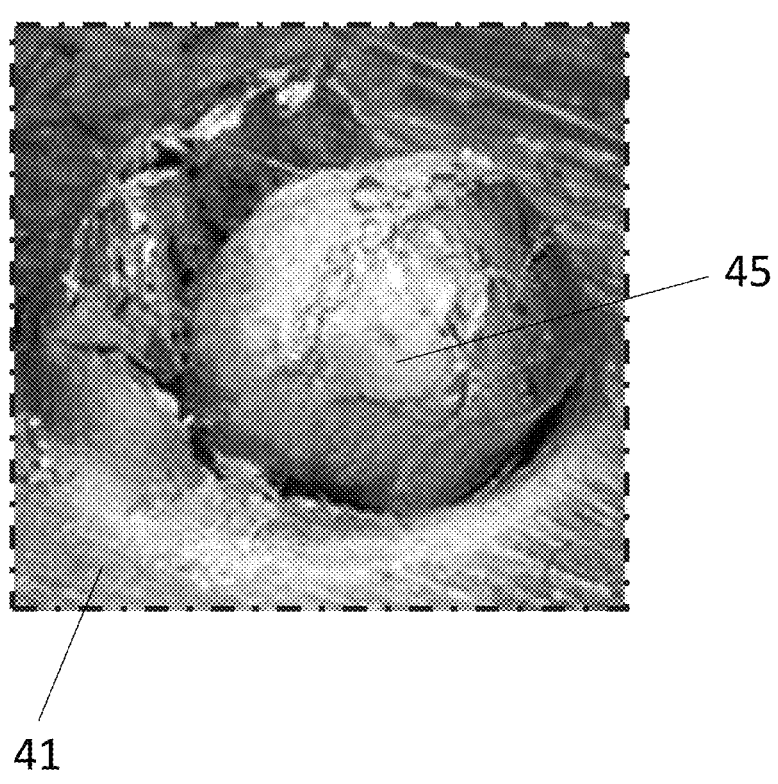
FIG. 7 shows a surface of a second element according to an exemplary connecting process.

FIG. 7 shows an image of a surface 41 of a second element 40 after a connection to a first element 30 by a connecting element 10. The connection was carried out according to a single-stage process described above.

The bulge 45 formed in the surface 41 shows discernible cracks or ruptures. As a result, the connection of the first element 30 to the second element 40 is not fault-free.

Figure 8:
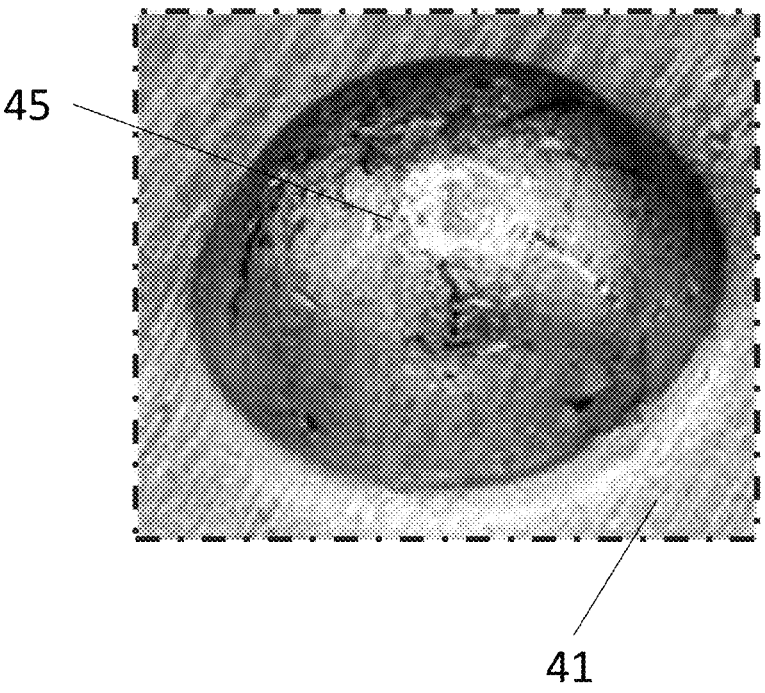
FIG. 8 shows a surface of a second element according to a connecting process according to the invention.

FIG. 8 shows an image of a surface 41 of a second element 40 after a connection to a first element 30 by a connecting element 10. The connection was carried out according to a two-stage process according to the invention described above.

The bulge 45 formed in the surface 41 is smooth and surrounds the connecting element in a fault-free manner. As a result, the connection of the first element 30 to the second element 40 is improved.

What is claimed is:

1. A method for connecting at least two elements by a connecting element, the method comprising:
    providing a first element, a second element and the connecting element;
    placing the connecting element on a surface of the first element;
    in a first time period, rotating the connecting element at a first rotational speed and exerting a first axial force on the connecting element in a direction of the surface of the first element; and
    in a second time period, rotating the connecting element at a second rotational speed and exerting a second axial force on the connecting element in the direction of the surface of the first element;
    wherein (i) the first rotational speed in the first time period is lower than the second rotational speed in the second time period, and (ii) the first axial force in the first time period is higher than the second axial force in the second time period.

2. The method according to claim 1, wherein the first rotational speed in the first time period is at least 30% lower than the second rotational speed in the second time period and wherein the first axial force in the first time period is at least 40% higher than the second axial force in the second time period.

3. The method according to claim 1, wherein a length of the first time period and a length of the second time period are based on a penetration depth of the connecting element into the first element or into the first element and the second element.

4. The method according to claim 1, wherein the connecting element comprises a head and a shank, wherein the shank has a threaded portion and a tip portion opposite the head, wherein the tip portion has no thread.

5. The method according to claim 4, wherein the threaded portion does not contact the first element and the second element at least temporarily in the first time period.

6. The method according to claim 4, wherein the tip portion is surrounded by the first and second element when the first and second element are connected to each other.

7. The method according to claim 1, wherein an energy input into the first and second element is greater in the second time period than in the first time period.

8. The method according to claim 1, wherein the first element is a metal element and the second element is an aluminum die-cast element.

9. The method according to claim 1, wherein the first rotational speed in the first time period and the second rotational speed in the second time periodare constant at least in sections; and wherein the first axial force in the first time period is constant at least in sections and the second axial force in the second time period increases at least in sections.

10. The method according to claim 1, wherein the method further comprises:

in a third time period, rotating the connecting element at a third rotational speed and exerting a third axial force on the connecting element in the direction of the surface of the first element;

wherein the third rotational speed in the third time period is lower than the first rotational speed in the first time period and lower than the second rotational speed in the second time period; and wherein the third axial force in the third time period is lower than the first axial force in the first time period and lower than the second axial force in the second time period.

* * * * *